United States Patent
Mun et al.

(10) Patent No.: US 12,371,596 B2
(45) Date of Patent: Jul. 29, 2025

(54) POROUS ADHESIVE FILM, OPTICAL MEMBER COMPRISING SAME, AND OPTICAL DISPLAY DEVICE COMPRISING SAME

(71) Applicant: Samsung SDI Co., Ltd., Yongin-si (KR)

(72) Inventors: Sung Hyun Mun, Suwon-si (KR); Ji Ho Kim, Suwon-si (KR); Ji Won Kang, Suwon-si (KR); Il Jin Kim, Suwon-si (KR); Kyoung Gon Park, Suwon-si (KR); Gwang Hwan Lee, Suwon-si (KR); Jin Young Lee, Suwon-si (KR); Jae Hyun Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 664 days.

(21) Appl. No.: 17/284,133

(22) PCT Filed: Jun. 26, 2019

(86) PCT No.: PCT/KR2019/007738
§ 371 (c)(1),
(2) Date: Apr. 9, 2021

(87) PCT Pub. No.: WO2020/075951
PCT Pub. Date: Apr. 16, 2020

(65) Prior Publication Data
US 2021/0332273 A1      Oct. 28, 2021

(30) Foreign Application Priority Data
Oct. 10, 2018  (KR) .................. 10-2018-0120784

(51) Int. Cl.
*C09J 133/08* (2006.01)
*C09J 7/10* (2018.01)
(Continued)

(52) U.S. Cl.
CPC ............... *C09J 133/08* (2013.01); *C09J 7/10* (2018.01); *C09J 7/385* (2018.01); *C09J 11/06* (2013.01);
(Continued)

(58) Field of Classification Search
CPC ... C09J 7/00; C09J 7/385; C09J 133/08; C09J 2400/24; C09K 2323/055; C08G 18/003;
(Continued)

(56) References Cited

U.S. PATENT DOCUMENTS

2005/0244633 A1    11/2005  Kobayashi et al.
2009/0229732 A1*    9/2009  Determan .............. C09J 7/243
                                                                    156/60
(Continued)

FOREIGN PATENT DOCUMENTS

CN         2699590 Y    *  5/2005
CN       113166599 B    * 10/2023 .............. C09J 11/06
(Continued)

OTHER PUBLICATIONS

Chinese Office action dated Jun. 29, 2022 issued in corresponding CN Application No. 201980080287.4, 7 pages.
(Continued)

*Primary Examiner* — Sophie Hon
(74) *Attorney, Agent, or Firm* — Womble Bond Dickinson (US) LLP (57) ABSTRACT

The present invention provides: a porous adhesive film which is formed from an adhesive composition including (meth)acrylic copolymers having hydroxyl groups and alkylene glycol groups, and which has a modulus of less
(Continued)

than approximately 30 kPa at 25° C. and a peel strength of approximately 700 gf/in or greater at 25° C.; an optical member comprising same; and an optical display device comprising same.

12 Claims, 1 Drawing Sheet (51) Int. Cl.
  *C09J 7/38* (2018.01)
  *C09J 11/06* (2006.01)
  *G02B 1/14* (2015.01)
(52) U.S. Cl.
  CPC .... *C09J 2203/318* (2013.01); *C09J 2301/312* (2020.08); *C09J 2433/00* (2013.01); *G02B 1/14* (2015.01)
(58) Field of Classification Search
  CPC .. C08G 18/792; C08G 18/3876; C08G 59/22; C08G 59/66; C08F 283/10; C08F 222/103; C08L 63/00
  See application file for complete search history.

(56) References Cited

U.S. PATENT DOCUMENTS

| | | | | |
|---|---|---|---|---|
| 2013/0079428 | A1* | 3/2013 | Lunde | ................ A61F 13/0253 521/154 |
| 2014/0186603 | A1 | 7/2014 | Kim et al. | |
| 2015/0030795 | A1* | 1/2015 | Ogawa | ....................... C09J 4/00 428/41.3 |
| 2015/0030839 | A1* | 1/2015 | Satrijo | ..................... C08L 53/00 428/220 |
| 2016/0177146 | A1 | 6/2016 | Mun et al. | |

FOREIGN PATENT DOCUMENTS

| | | | | |
|---|---|---|---|---|
| JP | 2599725 | B2 * | 4/1997 | .......... C08F 290/044 |
| JP | 2003-064325 | A | 3/2003 | |
| JP | 2005-314579 | A | 11/2005 | |
| JP | 2009263542 | A * | 11/2009 | ............... C08J 9/30 |
| KR | 10-2006-0047584 | A | 5/2006 | |
| KR | 10-2007-0055363 | A | 5/2007 | |
| KR | 10-2014-0085259 | A | 7/2014 | |
| KR | 10-2015-0123368 | | 11/2015 | |
| KR | 10-2017-0070753 | A | 6/2017 | |
| KR | 20170070753 | A * | 6/2017 | ................ C09J 7/00 |
| KR | 10-2017-0114642 | A | 10/2017 | |
| KR | 102319559 | B1 * | 10/2021 | ............. C09J 11/06 |

OTHER PUBLICATIONS

International Search Report for corresponding Application No. PCT/KR2019/007738 dated Sep. 24, 2019, 4pp.

* cited by examiner

POROUS ADHESIVE FILM, OPTICAL MEMBER COMPRISING SAME, AND OPTICAL DISPLAY DEVICE COMPRISING SAME

CROSS-REFERENCE TO RELATED APPLICATIONS

This application is a U.S. National Phase Patent Application of International Application Number PCT/KR2019/007738, filed on Jun. 26, 2019, which claims priority to Korean Patent Application Number 10-2018-0120784, filed on Oct. 10, 2018, the entire contents of both of which are incorporated herein by reference.

TECHNICAL FIELD

The present invention relates to a porous adhesive film, an optical member including the same, and an optical display device including the same.

BACKGROUND ART

An optical display includes multiple optical elements, including a display panel, stacked one above another. Since a display panel, particularly an organic light emitting diode panel, is vulnerable to external impact, the optical display device is provided with separate optical elements for improvement in impact resistance. In general, porous polyurethane foam or acryl foam is used to improve impact resistance. The polyurethane foam or the acryl foam does not exhibit adhesion. Accordingly, an adhesive foam tape having a triple-layer structure in which an adhesive layer is formed on both surfaces of the polyurethane foam or the acryl foam is used. However, since the polyurethane foam or the acryl foam does not exhibit adhesion, delamination occurs between the polyurethane foam or the acryl foam and the adhesive layer upon folding the foam tape, providing restriction in use of the foam tape in a foldable display device. Moreover, the foam tape having such a triple-layer structure provides restriction in thickness reduction of the display.

The background technique of the present invention is disclosed in Korean Patent Laid-open Publication No. 10-2007-0055363 and the like.

DISCLOSURE

Technical Problem

It is an aspect of the present invention to provide a porous adhesive film that has good impact resistance and flexural reliability even with a monolayer structure.

It is another aspect of the present invention to provide a porous adhesive film that has good peel strength with respect to an adherend.

Technical Solution

A porous adhesive film according to the present invention is formed of an adhesive composition including a (meth) acrylic copolymer having a hydroxyl group and an alkylene glycol group and has a modulus of less than about 30 kPa at 25° C. and a peel strength of about 700 gf/in or more at 25° C.

An optical member according to the present invention may include an optical film and the porous adhesive film according to the present invention formed on at least one surface of the optical film.

An optical display device according to the present invention may include the porous adhesive film according to the present invention.

Advantageous Effects

The present invention provides a porous adhesive film that has good impact resistance and flexural reliability even with a monolayer structure.

The present invention provides a porous adhesive film that has good peel strength with respect to an adherend.

BEST MODE

Hereinafter, embodiments of the present invention will be described in detail with reference to the accompanying drawings such that the present invention can be easily implemented by those skilled in the art. It should be understood that the present invention may be embodied in different ways and is not limited to the following embodiments.

As used herein to represent a specific numerical range, the expression "X to Y" means "X≤ and ≤Y".

Herein, "(meth)acryl" refers to acryl and/or methacryl.

Herein, "copolymer" may include an oligomer, a polymer, or a resin.

Herein, "average particle diameter" of organic nanoparticles refers to a particle diameter thereof, as measured in a water-based or organic solvent using a Zetasizer nano-ZS (Malvern Co., Ltd.) and represented by a Z-average value, and observed by SEM/TEM.

Herein, "modulus" means storage modulus (G').

Herein, "glass transition temperature (Tg) in a homopolymer phase" may mean a glass transition temperature measured with respect to a homopolymer of a target monomer using a DSC Discovery (TA Instrument Inc.). Specifically, the homopolymer of the target monomer is heated to 180° C. at a rate of 20° C./min, slowly cooled to −180° C. at the same rate, and heated to 100° C. at 10° C./min in order to obtain an endothermic transition curve. Then, an inflection point of the endothermic transition curve may be determined as the glass transition temperature.

Hereinafter, a porous adhesive film according to one embodiment of the invention will be described.

The porous adhesive film (hereinafter, "adhesive film") according to the embodiment of the present invention may be formed of an adhesive composition including a (meth) acrylic copolymer having a hydroxyl group and an alkylene glycol group, and may have a modulus of less than about 30 kPa at 25° C. With this structure, the adhesive film has good impact resistance and flexural reliability even with a monolayer structure. Here, "good impact resistance" means that a height evaluated by a ball drop test in the experimental example described below is about 150 mm or more, or about 200 mm or more, for example, about 150 mm to about 500 mm, or about 200 mm to about 500 mm.

The adhesive film is a porous film containing bubbles and is formed of the adhesive composition including a (meth)

acrylic copolymer having a hydroxyl group and an alkylene glycol group, thereby remarkably improving impact resistance together with flexural reliability. Even when an adhesive film is formed of the adhesive composition including a (meth)acrylic copolymer having a hydroxyl group and an alkylene glycol group, the adhesive film not having bubbles exhibits poor properties in terms of impact resistance and flexural reliability. Even with the bubbles, the adhesive film formed of the adhesive composition including a (meth) acrylic copolymer having a hydroxyl group and an alkylene glycol group exhibits poor properties in terms of impact resistance and flexural reliability. Preferably, the adhesive film has a modulus at 25° C. of less than about 30 kPa, about 29.9 kPa or less, or about 10 kPa to about 29.9 kPa, for example, about 20 kPa to about 29 kPa, for example, about 21 kPa to about 27 kPa, about 21 kPa, about 22 kPa, about 23 kPa, about 24 kPa, about 25 kPa, about 26 kPa, or about 27 kPa. Within this range, the adhesive film can improve flexural reliability.

The adhesive film is porous and contains bubbles. With the bubbles, the adhesive film can improve flexural reliability and impact resistance. In addition, with the structure containing the bubbles, the adhesive film has low modulus, thereby improving flexural reliability. The bubbles may be distributed over the adhesive film, without being limited thereto.

In the adhesive film, the bubbles may be independently arranged or in combination of a connected arrangement and an independent arrangement.

The bubbles may have a spherical shape, without being limited thereto. The bubbles may have a smaller average diameter than the thickness of the adhesive film and may have an average diameter of, for example, about 1 nm to about 100 about 1 nm, about 10 nm, about 100 nm, about 1 μm, about 10 μm, about 20 μm, about 30 μm, about 40 μm, about 50 μm, about 60 μm, about 70 μm, about 80 μm, about 90 μm, or about 100 μm, without being limited thereto. Within this range, the adhesive film can improve impact resistance. The "average diameter" means D50 and may be measured by a typical method known to those skilled in the art.

Although the bubbles may be free from a gas therein, the bubbles may include a certain gas to facilitate formation of the bubbles in the adhesive film while securing stability of the bubbles in the adhesive film, thereby improving reliability. The gas may include various gases, for example, air, an inert gas, such as nitrogen, carbon dioxide, and argon, and the like. The gas is required to obstruct reaction in the course of forming the adhesive film. Preferably, nitrogen is used as the gas.

Relative to the total volume of the porous adhesive film, the bubbles may occupy a volume of about 5% by volume (vol %) to about 50 vol %, preferably about 8 vol % to about 40 vol %, for example, about 8 vol %, about 9 vol %, about 10 vol %, about 11 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, about 25 vol %, about 26 vol %, about 27 vol %, about 28 vol % about 29 vol %, about 30 vol %, about 31 vol %, about 32 vol %, about 33 vol %, about 34 vol %, about 35 vol %, about 36 vol %, about 37 vol %, about 38 vol %, about 39 vol %, or about 40 vol %. Within this range, the adhesive film can have effects due to the presence of the bubbles and can prevent problems, such as deterioration in peel strength or poor external appearance.

The bubbles may be formed in the adhesive film by any method without limitation. In one embodiment, bubbling may be performed in the course of forming the adhesive film to form the bubbles in the adhesive film. In another embodiment, a foaming agent may be mixed with a composition for the adhesive film such that the manufactured adhesive film contains the foaming agent. The foaming agent may be selected from any well-known foaming agent in the art. As the foaming agent, thermally expandable microspheres may be used.

The adhesive film may be formed of the adhesive composition including a (meth)acrylic copolymer having a hydroxyl group and an alkylene glycol group, which is a non-urethane based composition. The (meth)acrylic copolymer having a hydroxyl group and an alkylene glycol group forms a matrix of the adhesive film and can improve peel strength, impact resistance and flexural reliability of the adhesive film. The adhesive film formed of the adhesive composition including the (meth)acrylic copolymer having a hydroxyl group and an alkylene glycol group and having porosity can remarkably improve impact resistance and flexural reliability.

The (meth)acrylic copolymer having a hydroxyl group and an alkylene glycol group may have a glass transition temperature of about −100° C. to about 10° C., specifically about −70° C. to about 0° C., for example, about −70° C., about −60° C., about −50° C., about −40° C., about −30° C., about −20° C., about −10° C., or about 0° C. Within this range, the adhesive film can have good peel strength and reliability over a broad temperature range. The (meth)acrylic copolymer having a hydroxyl group and an alkylene glycol group may have an index of refraction of about 1.35 to about 1.70, specifically about 1.40 to about 1.60, for example, about 1.40, about 1.45, about 1.50, about 1.55, or about 1.60. Within this range, the adhesive film can maintain optical transparency when laminated on other optical devices. The (meth)acrylic copolymer having a hydroxyl group and an alkylene glycol group may include a copolymer of a monomer mixture including a hydroxyl group-containing (meth) acrylate, an alkylene glycol group-containing (meth)acrylate, and an alkyl group-containing (meth)acrylate.

The hydroxyl group-containing (meth)acrylate can impart peel strength to the adhesive film. The hydroxyl group-containing (meth)acrylate may be a $C_1$ to $C_{10}$ (meth)acrylate containing at least one hydroxyl group. For example, the hydroxyl group-containing (meth)acrylate may include at least one selected from among 2-hydroxybutyl (meth)acrylate, 4-hydroxybutyl (meth)acrylate, 2-hydroxyethyl (meth) acrylate, 2-hydroxypropyl (meth)acrylate, 3-hydroxypropyl (meth)acrylate, and 6-hydroxyhexyl (meth)acrylate, without being limited thereto.

In the monomer mixture, the hydroxyl group-containing (meth)acrylate may be present in an amount of about 5 wt % to about 40 wt %, for example, about 10 wt % to about 35 wt %, about 15 wt % to about 30 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %. Within this range, the adhesive film can have improved peel strength and durability.

The alkylene glycol group-containing (meth)acrylate contains an alkylene glycol group, thereby improving impact resistance and flexural reliability of the adhesive film while reducing modulus thereof. Herein, "alkylene glycol group" means ($C_2$ to $C_4$ alkylene-O—).

The alkylene glycol group-containing (meth)acrylate may have a glass transition temperature of about −55° C. to about −90° C. in a homopolymer phase, preferably about −60° C. to about −90° C., more preferably about −60° C. to about −75° C., for example, about −60° C., about −61° C., about −62° C., about −63° C., about −64° C., about −65° C., about −66° C., about −67° C., about −68° C., about −69° C., about −70° C., about −71° C., about −72° C. about −73° C., about −74° C., or about −75° C. Within this range, the adhesive film can have low modulus while improving flexural reliability. The alkylene glycol group-containing (meth)acrylate may include a mono-functional acrylate having an ethylene oxide group (—CH$_2$CH$_2$O—) or a propylene oxide group (—CH$_2$CH$_2$CH$_2$O—), preferably an ethylene oxide group.

The alkylene glycol group-containing (meth)acrylate may include, for example, at least one selected from among methoxy polyethylene glycol (meth)acrylate containing 6 moles to 13 moles of ethylene glycol, ethyl hexyl polyethylene glycol (meth)acrylate containing 2 moles to 10 moles of ethylene glycol, and octyl polyethylene glycol (meth)acrylate. Preferably, the alkylene glycol group-containing (meth)acrylate includes at least one selected from among methoxy polyethylene glycol (meth)acrylate, ethylhexyl diethylene glycol (meth)acrylate, ethyl hexyl triethylene glycol (meth)acrylate, and octyl diethylene glycol (meth)acrylate. More preferably, the alkylene glycol group-containing (meth)acrylate is methoxy polyethylene glycol (meth)acrylate.

In the monomer mixture, the alkylene glycol group-containing (meth)acrylate may be present in an amount of about 0.01 wt % to about 20 wt %, preferably about 0.1 wt % to about 10 wt %, more preferably about 1 wt % to about 5 wt %, for example, about 1 wt %, about 2 wt %, about 3 wt %, about 4 wt %, or about 5 wt %. Within this range, the adhesive film can have improved repeated flexural reliability and impact resistance.

The alkyl group-containing (meth)acrylate may form a matrix of the adhesive film. In one embodiment, the alkyl group-containing (meth)acrylate may be a non-alkylene glycol (meth)acrylate free from an alkylene glycol group. The alkyl group-containing (meth)acrylate may be an unsubstituted linear or branched $C_1$ to $C_{10}$ alkyl group-containing (meth)acrylate. For example, the alkyl group-containing (meth)acrylate may include at least one selected from among 2-ethylhexyl (meth)acrylate, n-butyl (meth)acrylate, iso-octyl (meth)acrylate, propyl (meth)acrylate, t-butyl (meth)acrylate, iso-butyl (meth)acrylate, pentyl (meth)acrylate, hexyl (meth)acrylate, heptyl (meth)acrylate, octyl (meth)acrylate, nonyl (meth)acrylate, and decyl (meth)acrylate, preferably at least one selected from among 2-ethyl hexyl (meth)acrylate, n-butyl (meth)acrylate, and iso-octyl (meth)acrylate, more preferably 2-ethyl hexyl (meth)acrylate.

In the monomer mixture, the alkyl group-containing (meth)acrylate may be present in an amount of about 50 wt % to about 80 wt %, preferably about 55 wt % to about 80 wt %, or about 50 wt % to about 75 wt %, for example, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, or about 80 wt %. Within this range, the adhesive film can have good flexural reliability at low temperature and under high temperature/humidity conditions.

The monomer mixture for the (meth)acrylic copolymer having a hydroxyl group and an alkylene glycol group may further include a copolymerizable monomer in addition to the hydroxyl group-containing (meth)acrylate, the alkylene glycol group-containing (meth)acrylate, and the alkyl group-containing (meth)acrylate. The copolymerizable monomer may be added to the (meth)acrylic copolymer to provide additional effects to the adhesive film. The copolymerizable monomer is a different monomer from the above monomers and may include at least one selected from among an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group monomer.

The amine group-containing monomer may be an amine group-containing (meth)acrylic monomer, such as monomethyl aminoethyl (meth)acrylate, monoethyl aminoethyl (meth)acrylate, monomethyl aminopropyl (meth)acrylate, monoethyl aminopropyl (meth)acrylate, dimethyl aminoethyl (meth)acrylate, diethyl aminoethyl (meth)acrylate, N-tert-butyl aminoethyl (meth)acrylate, and (meth)acryloxyethyl trimethyl ammonium chloride acrylate, without being limited thereto.

The alkoxy group-containing monomer may include 2-methoxyethyl (meth)acrylate, 2-methoxypropyl (meth)acrylate, 2-ethoxypropyl (meth)acrylate, 2-buthoxypropyl (meth)acrylate, 2-methoxypentyl (meth)acrylate, 2-ethoxypentyl (meth)acrylate, 2-buthoxyhexyl (meth)acrylate, 3-methoxypentyl (meth)acrylate, 3-ethoxypentyl (meth)acrylate, and 3-buthoxyhexyl (meth)acrylate, without being limited thereto.

The phosphoric acid group-containing monomer may be a phosphoric acid group-containing acrylic monomer, such as 2-(meth)acryloyloxyethyl diphenyl phosphate acrylate, trimethacryloyloxyethyl phosphate acrylate, and triacryloyloxyethyl phosphate acrylate, without being limited thereto.

The sulfonic acid group-containing monomer may be a sulfonic acid group-containing acrylic monomer, such as sodium sulfopropyl acrylate, sodium 2-sulfoethyl acrylate, and sodium 2-acrylamido-2-methylpropane sulfonate, without being limited thereto.

The phenyl group-containing monomer may be a phenyl group-containing acrylic vinyl monomer, such as p-tert-butyl phenyl acrylate, o-biphenyl acrylate, and phenoxy ethyl acrylate, without being limited thereto.

The silane group-containing monomer may be a silane group-containing vinyl monomer, such as 2-acetoacetoxyethyl acrylate, vinyl trimethoxysilane, vinyl triethoxysilane, vinyl tris(2-methoxyethyl)silane, vinyl triacetoxysilane, and acryloyloxypropyl trimethoxysilane, without being limited thereto.

The carboxylic acid group-containing monomer may include acrylic acid, 2-carboxyethyl acrylate, 3-carboxypropyl acrylate, 4-carboxybutyl acrylate, itaconic acid, crotonic acid, maleic acid, fumaric acid, and maleic anhydride, without being limited thereto.

The amide group monomer may include acrylamide, N-methylacrylamide, N-methylolacrylamide, N-methoxymethylacrylamide, N,N-methylenebisacrylamide, N-hydroxyethylacrylamide, and N,N-diethylacrylamide, without being limited thereto.

In the monomer mixture, the copolymerizable monomer may be present in an amount of 30 wt % or less, preferably 0 wt % to 30 wt %, for example, about 0 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %. Within this range, the adhesive film can have high adhesive strength.

The adhesive composition may further include an initiator. The initiator serves to form an adhesive film by curing the adhesive composition or to form the (meth)acrylic copolymer having a hydroxyl group and an alkylene glycol group through polymerization of the monomer mixture in the adhesive composition.

The initiator may include at least one selected from among a photopolymerization initiator and a thermal polymerization initiator.

The photopolymerization initiator may be selected from any initiators so long as the initiator can induce polymerization of a radical polymerizable compound during curing through light irradiation. For example, the photopolymerization initiator may include benzoin, hydroxy ketone, amino ketone, phosphine oxide photoinitiators, and the like. Specifically, the photopolymerization initiator may include benzoin, benzoin methyl ether, benzoin ethyl ether, benzoin isopropyl ether, benzoin n-butyl ether, benzoin isobutyl ether, acetophenone compounds, such as 2,2-dimethoxy-2-phenyl acetophenone, 2,2'-diethoxy acetophenone, 2,2'-dibuthoxy acetophenone, 2-hydroxy-2-methyl propiophenone, p-t-butyl trichloroacetophenone, p-t-butyl dichloroacetophenone, 4-chloroacetophenone, 2,2'-dichloro-4-phenoxyacetophenone, dimethylaminoacetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4-diethyl aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto.

The thermal polymerization initiator may be selected from any typical initiators, for example, azo, peroxide and redox compounds. Examples of the azo compound may include 2,2-azobis(2-methylbutyronitrile), 2,2-trilazobis(isobutyronitrile), 2,2-trilazobis(2,4-dimethylvaleronitrile), 2,2-nitazobis-2-hydroxymethylpropionitrile, dimethyl-2,2-methylazobis(2-methylpropionate), and 2,2-pioazobis(4-methoxy-2,4-dimethylvaleronitrile), without being limited thereto. Examples of the peroxide compound may include: inorganic peroxides, such as potassium perchlorate, ammonium persulfate, and hydrogen peroxide; and organic peroxides, such as diacyl peroxide, peroxydicarbonate, peroxyester, tetramethylbutyl peroxyneodecanoate, bis(4-butylcyclohexyl)peroxydicarbonate, di(2-ethylhexyl) peroxycarbonate, butylperoxy neodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl)peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reducing agent, without being limited thereto.

The initiator may be present in an amount of about 0.0001 parts by weight to about 5 parts by weight, specifically about 0.001 parts by weight to about 3 parts by weight, more specifically about 0.001 parts by weight to about 1 part by weight, for example, about 0.001 parts by weight, about 0.005 parts by weight, about 0.01 parts by weight, about 0.05 parts by weight, about 0.1 parts by weight, about 0.2 parts by weight, about 0.3 parts by weight, about 0.4 parts by weight, about 0.5 parts by weight, about 0.6 parts by weight, about 0.7 parts by weight, about 0.8 parts by weight, about 0.9 parts by weight, or about 1 part by weight, relative to 100 parts by weight of the monomer mixture or the (meth)acrylic copolymer having a hydroxyl group and an alkylene glycol group. Within this range, the initiator allows complete curing of the adhesive composition, can prevent deterioration in transmittance of the adhesive film due to residual initiator, can reduce bubble generation, and can exhibit good reactivity.

The adhesive composition may further include a crosslinking agent. The crosslinking agent can improve mechanical strength of the adhesive film through improvement in crosslinking degree of the adhesive composition.

The crosslinking agent may include a polyfunctional (meth)acrylate capable of being cured by actinic radiation. For example, the crosslinking agent may include bifunctional (meth)acrylates, such as 1,4-butanediol di(meth)acrylate, 1,6-hexanediol di(meth)acrylate, neopentyl glycol di(meth)acrylate, polyethyleneglycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethyl isocyanurate; tetrafunctional acrylates, such as diglycerin tetra(meth)acrylate and pentaerythritol tetra(meth)acrylate; pentafunctional acrylates, such as dipentaerythritol penta(meth)acrylate; and hexafunctional acrylates, such as dipentaerythritol hexa(meth)acrylate, caprolactone-modified dipentaerythritol hexa (meth)acrylate, and urethane (meth)acrylates (for example, reaction products of an isocyanate monomer and trimethylolpropane tri(meth)acrylate), without being limited thereto.

Preferably, the crosslinking agent is an alkylene glycol group-containing crosslinking agent. The alkylene glycol group-containing crosslinking agent has good compatibility with the (meth)acrylic copolymer having a hydroxyl group and an alkylene glycol group, particularly the alkylene glycol group, and can further improve impact resistance and flexural reliability. For example, as an alkylene glycol group-containing polyfunctional (meth)acrylate, the crosslinking agent may include polyalkylene glycol di(meth)acrylate including polyethylene glycol di(meth)acrylate. The "alkylene glycol group" may be an ethylene oxide group ($-CH_2CH_2O-$) or a propylene oxide group ($-CH_2CH_2CH_2O-$).

The crosslinking agent may be present in an amount of about 0.001 parts by weight to about 5 parts by weight, specifically about 0.003 parts by weight to about 3 parts by weight, specifically about 0.005 parts by weight to about 1 part by weight, for example, about 0.005 parts by weight, about 0.01 parts by weight, about 0.05 parts by weight, about 0.1 parts by weight, about 0.2 parts by weight, about 0.3 parts by weight, about 0.4 parts by weight, about 0.5 parts by weight, about 0.6 parts by weight, about 0.7 parts by weight, about 0.8 parts by weight, about 0.9 parts by weight, or about 1 part by weight, relative to 100 parts by weight of the monomer mixture or the (meth)acrylic copolymer having a hydroxyl group and an alkylene glycol group. Within this range, the adhesive film can have good peel strength and reliability.

The adhesive composition may further include additives. The additives may be selected from typical additives for adhesive compositions well-known in the art. For example, the additives may include at least one selected from among pigments, UV absorbents, leveling agents, and antistatic agents, without being limited thereto.

The adhesive film may have a peel strength of about 700 gf/in or more at 25° C., specifically about 900 gf/in or more, more specifically about 1,000 gf/in to about 3,000 gf/in. Within this range, the adhesive film can have good durability. Herein, "peel strength" refers to T-peel strength. T-peel strength may be measured by the method in examples described below.

The adhesive film may have a modulus of about 50 kPa or less at 80° C. Within this range, the adhesive film has good flexibility, thereby providing good flexural reliability. Specifically, the adhesive film may have a modulus at 80° C. of about 10 kPa to about 30 kPa, or about 15 kPa to about 25 kPa.

The adhesive film may have a modulus of less than about 30 kPa at 25° C., and a modulus ratio (modulus at 25° C.:modulus at 80° C.) of about 1:0.5 to about 1:1.0, preferably about 1:0.7 to about 1:0.9, for example, about 1:0.5, about 1:0.6, about 1:0.7, about 1:0.8, about 1:0.9, or about 1:1.0. Within this range, the adhesive film can have good flexural reliability at room temperature and high temperature.

The adhesive film may have a haze of about 2% or less, specifically about 0.1% to about 1%, and a total light transmittance of about 90% or more, specifically about 95% to about 99%, in the visible spectrum (for example, in the wavelength range of 380 nm to 780 nm). Within this range, the adhesive film has good optical transparency and is applicable to an optical display.

The adhesive film may have a thickness of 10 μm to 300 μm, specifically about 20 μm to about 180 μm, for example, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, or about 180 μm. Within this range, the adhesive film is applicable to an optical display.

The adhesive composition may be prepared through partial polymerization of the monomer mixture for the (meth)acrylic copolymer having a hydroxyl group and an alkylene glycol group with the initiator, followed by adding an additional initiator. The adhesive composition may further include the crosslinking agent and the additives described above. Alternatively, the adhesive composition may be prepared through partial polymerization of a mixture including the initiator and the monomer mixture for the (meth)acrylic copolymer having a hydroxyl group and an alkylene glycol group, followed by adding an additional initiator. The crosslinking agent and the additives described above may be further added to the mixture. Partial polymerization may include solution polymerization, suspension polymerization, photopolymerization, bulk polymerization, or emulsion polymerization. Specifically, solution polymerization may be performed at about 50° C. to about 100° C. by adding an initiator to the monomer mixture. The initiator may include a photopolymerization initiator, such as an acetophenone compound including 2,2-dimethoxy-2-phenylacetophenone, 1-hydroxycyclohexylphenylketone, and the like. Partial polymerization may be performed to achieve a viscosity at 25° C. of about 300 cP to about 50,000 cP, specifically about 500 cP to about 9,000 cP, for example, about 500 cP, about 1,000 cP, about 1,500 cP, about 2,000 cP, about 2,500 cP, about 3,000 cP, about 3,500 cP, about 4,000 cP, about 4,500 cP, about 5,000 cP, about 5,500 cP, about 6,000 cP, about 6,500 cP, about 7,000 cP, about 7,500 cP, about 8,000 cP, about 8,500 cP, or about 9,000 cP.

The adhesive film may be produced by a typical method. For example, the adhesive film may be produced by coating the adhesive composition onto a release film, followed by curing. Curing may be performed under a low-pressure lamp at a wavelength of about 300 nm to about 400 nm and at a dose of about 400 mJ/cm$^2$ to about 3,000 mJ/cm$^2$ in an oxygen-free state.

Next, an adhesive film according to another embodiment of the present invention will be described.

The adhesive film according to this embodiment may be formed of an adhesive composition including a (meth)acrylic copolymer having a hydroxyl group and an alkylene glycol group and organic nanoparticles. The adhesive film according to this embodiment is substantially the same as the adhesive film according to the above embodiment excluding the presence of the organic nanoparticles.

The organic nanoparticles can further improve reliability of the adhesive film at high temperature by increasing the modulus of the adhesive film at high temperature to prevent delamination, slight lifting and/or bubble generation at high temperature. The organic nanoparticles have a high glass transition temperature, thereby improving the modulus of the adhesive film at high temperature.

In the adhesive film, the organic nanoparticles may be present in an amount of about 1 wt % to about 10 wt %, preferably about 1 wt % to about 5 wt %, for example, about 1 wt %, about 2 wt %, about 3 wt %, about 4 wt %, or about 5 wt %. Within this range, the organic nanoparticles can further improve reliability of the adhesive film at high temperature by increasing the modulus of the adhesive film at high temperature to prevent delamination, slight lifting and/or bubble generation at high temperature.

The organic nanoparticles may have an average particle diameter of about 10 nm to about 400 nm, specifically about 10 nm to about 300 nm, more specifically about 30 nm to about 280 nm, still more specifically about 50 nm to about 280 nm, for example, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, or about 280 nm. Within this range of average particle diameter, the organic nanoparticles do not affect foldability of the adhesive film and can secure good transparency of the adhesive film by securing a total light transmittance of about 90% or more in the visible spectrum.

A difference in index of refraction between the organic nanoparticles and the (meth)acrylic copolymer having a hydroxyl group and an alkylene glycol group may be about 0.1 or less, specifically about 0 to about 0.05 or less, more specifically about 0 to about 0.02. Within this range, the adhesive film can exhibit good transparency. The organic nanoparticles may have an index of refraction of about 1.35 to about 1.70, specifically about 1.40 to about 1.60, for example, about 1.40, about 1.45, about 1.50, about 1.55, or about 1.60. Within this range, the adhesive film can exhibit good transparency.

The organic nanoparticles may have a core-shell structure or a simple structure, such as bead type nanoparticles, without being limited thereto. In one embodiment, the organic nanoparticles may have a core-shell structure, in which the core and the shell satisfy the following Relation 1. That is, the organic nanoparticles may include nanoparticles in which the core and the shell are formed of organic materials. With the organic nanoparticles having the core-shell structure, the adhesive film can exhibit good foldability and balance between elasticity and flexibility.

$$Tg(c) < Tg(s) \qquad \text{<Relation 1>}$$

where Tg(c) is the glass transition temperature (unit: ° C.) of the core and Tg(s) is the glass transition temperature (unit: ° C.) of the shell.

Herein, the term "shell" means an outermost layer of the organic nanoparticle. The core may be a spherical particle. In some embodiments, the core may include an additional layer surrounding the spherical particle so long as the core has a glass transition temperature satisfying the above relation.

Specifically, the core has a glass transition temperature of about −150° C. to about 10° C., specifically about −150° C. to about −5° C., more specifically about −150° C. to about −20° C., for example, about −150° C., about −140° C., about −130° C., about −120° C., about −110° C., about −100° C., about −90° C., about −80° C., about −70° C., about −60° C., about −50° C., about −40° C., about −30° C., about −20° C. Within this range, the adhesive film can have good viscoelasticity at low temperature and/or at room temperature. The core may include at least one selected from among poly(alkyl acrylate), polysiloxane and polybutadiene each having a glass transition temperature within this range.

The poly(alkyl acrylate) may include at least one selected from among poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), poly(ethylhexyl methacrylate), and polysiloxane, without being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. Specifically, the crosslinked organosiloxane (co)polymer may include crosslinked dimethylsiloxane, methylphenylsiloxane, diphenylsiloxane, and mixtures thereof. With a copolymer of two or more organosiloxanes, the nanoparticles can have an index of refraction of about 1.41 to about 1.50, for example, about 1.41, about 1.42, about 1.43, about 1.44, about 1.45, about 1.46, about 1.47, about 1.48, about 1.49, or about 1.50.

A crosslinked state of the organosiloxane (co)polymer can be determined based on the degree of dissolution in various organic solvents. As the degree of crosslinking of the organosiloxane (co)polymer intensifies, the degree of dissolution of the organosiloxane (co)polymer is reduced. A solvent for determination of the crosslinked state may include acetone, toluene, and the like. Specifically, the organosiloxane (co)polymer may have a moiety which is not dissolved in acetone or toluene. The organosiloxane copolymer may include about 30% or more of insolubles in toluene.

The organosiloxane (co)polymer may further include an alkyl acrylate crosslinked polymer. The alkyl acrylate crosslinked polymer may include methyl acrylate, ethyl acrylate, n-butyl acrylate, 2-ethylhexyl acrylate, and the like. For example, the alkyl acrylate crosslinked polymer may be n-butyl acrylate or 2-ethylhexyl acrylate having a low glass transition temperature.

Specifically, the shell may have a glass transition temperature of about 15° C. to about 150° C., specifically about 35° C. to about 150° C., more specifically about 50° C. to about 140° C., for example, about 50° C., about 60° C., about 70° C., about 80° C., about 90° C., about 100° C., about 110° C., about 120° C., about 130° C., or about 140° C. Within this range, the organic nanoparticles can exhibit good dispersion in the acrylic copolymer. The shell may include poly(alkyl methacrylate) having a glass transition temperature within this range. For example, the shell may include at least one selected from among poly(methyl methacrylate) (PMMA), poly(ethyl methacrylate), poly(propyl methacrylate), poly(butyl methacrylate), poly(isopropyl methacrylate), poly(isobutyl methacrylate), and poly(cyclohexyl methacrylate), without being limited thereto.

In the organic nanoparticles, the core may be present in an amount of about 30 wt % to about 99 wt %, specifically about 40 wt % to about 95 wt %, more specifically about 50 wt % to about 90 wt %, for example, about 50 wt %, about 55 wt %, about 60 wt %, about 65 wt %, about 70 wt %, about 75 wt %, about 80 wt %, about 85 wt %, or about 90 wt %. Within this range, the adhesive film can exhibit good foldability in a broad temperature range. In the organic nanoparticles, the shell may be present in an amount of about 1 wt % to about 70 wt %, specifically about 5 wt % to about 60 wt %, more specifically about 10 wt % to about 50 wt %, for example, about 10 wt %, about 15 wt %, about 20 wt %, about 25 wt %, about 30 wt %, about 35 wt %, about 40 wt %, about 45 wt %, or about 50 wt %. Within this range, the adhesive film can exhibit good foldability in a broad temperature range.

The organic nanoparticles may be present in an amount of about 0.1 wt % to about 20 wt %, specifically about 0.5 wt % to about 10 wt %, specifically about 0.5 wt % to about 3 wt %, for example, about 0.5 wt %, about 1 wt %, about 1.5 wt %, about 2 wt %, about 2.5 wt %, or about 3 wt %, in the monomer mixture for the (meth)acrylic copolymer having a hydroxyl group and an alkylene glycol group. Within this range, the organic nanoparticles can secure good properties in terms of modulus of the adhesive film at high temperature, foldability of the adhesive film at room temperature and high temperature, and viscoelasticity of the adhesive film at low temperature and/or room temperature.

The organic nanoparticles may be prepared by typical emulsion polymerization, suspension polymerization, or solution polymerization.

An optical member according to one embodiment of the present invention includes an optical film and an adhesive film formed on at least one surface of the optical film, wherein the adhesive film includes the adhesive film according to the embodiments of the invention. Accordingly, the optical member exhibits good bending properties and/or good foldability and thus can be used in a flexible display.

In one embodiment, the optical film provides optical functions, for example, polarization, optical compensation, display quality improvement and/or conductivity, to a display device. Examples of the optical film may include a window film, a window, a polarizing plate, a color filter, a retardation film, an elliptical polarizing film, a reflective polarizing film, an anti-reflection film, a compensation film, a brightness improving film, an alignment film, a light diffusion film, a glass shatterproof film, a surface protective film, an OLED device barrier layer, a plastic LCD substrate, and a transparent electrode film including indium tin oxide (ITO), fluorinated tin oxide (FTO), aluminum-doped zinc oxide (AZO), carbon nanotubes (CNT), Ag nanowires, graphene, or the like. These optical films may be easily manufactured by a person having ordinary knowledge in the art.

For example, a touch pad may be attached to a window film or an optical film via the adhesive film, thereby forming a touch panel. Alternatively, the adhesive film may be applied to a typical polarizing film as in the related art.

In another embodiment, the optical film is an optically clear film and an optical member including the optical film and the adhesive film may act as a support layer for a display element. For example, the display element may include a window film and the like. The window film may include the optical member and a window coating layer (for example: a silicone coating layer) formed on the optical member. Specifically, the optical film may have a total light transmittance of about 90% or more in the visible spectrum and may be formed of at least one resin selected from among cellulose resins such as triacetylcellulose, polyester resins such as polyethylene terephthalate, polyethylene naphthalate, polybutylene terephthalate and polybutylene naphthalate, polycarbonate resins, polyimide resins, polystyrene resins, polyacrylate resins such as poly(methyl methacrylate), cyclic olefin polymer resins, acryl resins, and polyamide resins. The optical film may have a thickness of about 10 μm to about 100 μm, specifically about 20 μm to about 75 μm, more specifically about 30 μm to about 50 μm, for example, about 30 μm, about 31 μm, about 32 μm, about 33 μm, about 34 μm, about 35 μm, about 36 μm, about 37 μm, about 38 μm, about 39 μm, about about 41 μm, about 42 μm, about 43 μm, about 44 μm, about 45 μm, about 46 μm, about 47 μm, about 48 μm, about 49 μm, or about 50 μm. Within this range, the optical member can be used as the support layer for the display element.

In another embodiment, the optical film may be an electromagnetic wave-shielding optical film. The electromagnetic wave-shielding optical film may be formed of a composition containing an electromagnetic wave-shielding agent.

The optical member may be a bilayer optical member that includes an optical film and the adhesive film formed on one surface of the optical film. Alternatively, the optical member may be a tri- or more layer film laminate that includes at least two optical films attached to each other via the adhesive film according to the present invention.

In one embodiment, the optical member may be a tri-layer film laminate that includes a first optical film, a second optical film, and an adhesive film interposed between the first optical film and the second optical film to attach the first optical film to the second optical film, wherein the adhesive film is the adhesive film according to the present invention. Each of the first optical film and the second optical film may be formed of at least one resin selected from among a polyethylene terephthalate resin, a polycarbonate resin, a polyimide resin, a polyacrylate resin, a cyclic olefin polymer resin, and an acryl resin. Each of the first optical film and the second optical film may have a thickness of about 10 μm to about 100 μm, specifically about 20 μm to about 75 μm, more specifically about 30 μm to about 50 μm, for example, about 30 μm, about 35 μm, about 40 μm, about 45 μm, or about 50 μm, and the adhesive film may have a thickness of about 10 μm to about 100 μm, for example, about 10 μm, about 20 μm, about 30 μm, about 40 μm, about 50 μm, about 60 μm, about 70 μm, about 80 μm, about 90 μm, or about 100 μm. Within this thickness range, the optical member can maximize impact resistance while maintaining good foldability. The first optical film and the second optical film may have different thicknesses and may be formed of different materials.

An optical display device according to one embodiment of the present invention includes the adhesive film according to the present invention. The optical display device may include an organic light emitting diode display, a liquid crystal display, and the like. The optical display device may include a flexible display. In other embodiments, the optical display may include a non-flexible display.

Next, the present invention will be described in more detail with reference to examples. However, it should be noted that these examples are provided for illustration only and should not be construed in any way as limiting the invention.

Example 1

100 parts by weight of a monomer mixture, as listed in Table 1, and 0.005 parts by weight of an initiator (Irgacure 651) were sufficiently mixed in a reactor. After replacing dissolved oxygen in the reactor with nitrogen gas, the monomer mixture was subjected to partial polymerization through irradiation with UV light for several minutes under a low-pressure mercury lamp, thereby preparing a viscous liquid having a viscosity of 5,000 cP at 25° C. 0.3 parts by weight of an initiator (Irgacure 651) and 0.1 parts by weight of a crosslinking agent were added to the viscous liquid and mixed therewith, followed by stirring for 30 minutes, thereby preparing an adhesive composition containing nitrogen gas. The adhesive composition was coated onto a polyethylene terephthalate (PET) release film and irradiated with UV light at a dose of 2,000 mJ/cm², thereby preparing an adhesive sheet in which a porous adhesive film is laminated on the PET film.

Examples 2 to 4

Each adhesive sheet of an adhesive film and a PET film was fabricated in the same manner as in Example 1 except that the components of the adhesive composition were changed as listed in Table 1.

Comparative Example 1

An adhesive sheet of an adhesive film and a PET film was fabricated in the same manner as in Example 1 except that the components of the adhesive composition were changed as listed in Table 1.

Comparative Examples 2 and 3

Each adhesive sheet of an adhesive film and a PET film was fabricated in the same manner as in Example 1 except that the components of the adhesive composition were changed as listed in Table 1 and bubbles were not formed.

The adhesive films were removed from the PET films of the adhesive sheets of Examples and Comparative Examples and were evaluated as to the following properties as listed in Table 1, and evaluation results are shown in Table 1.

(1) Modulus (unit: kPa): Modulus was measured under auto-strain conditions at a shear rate of 1 rad/sec and a strain of 1% using a rheometer (MCR-501, Anton Paar Co., Ltd.) as a dynamic viscoelasticity instrument. Plural adhesive films prepared in each of Examples and Comparative Examples were laminated to a thickness of 400 µm, followed by punching the laminate using an 8 mm diameter punching machine, thereby preparing a specimen. With a normal force of 300 gf applied to the specimen, modulus was measured at 25° C. and at 80° C. while increasing temperature from −60° C. to 90° C. at a rate of 5° C./min.

Figure 1:
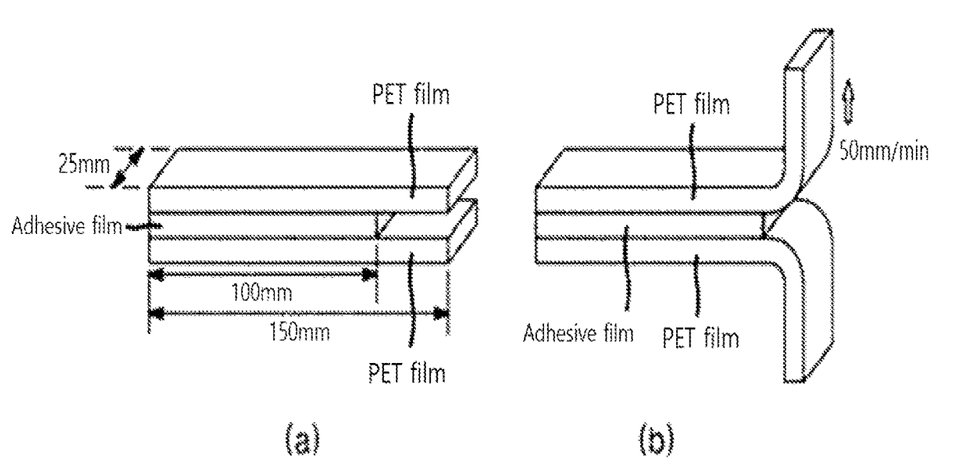
FIG. 1 is a plan view and a sectional view of a specimen for measuring T-peel strength of a porous adhesive film according to the present invention.

(2) Peel strength (unit: gf/in): An adhesive film having a size of 100 mm×25 mm×100 µm (length×width×thickness) was obtained by releasing the PET film from each of the adhesive sheets prepared in Examples and Comparative Examples. One surface of the PET film having a size of 150 mm×25 mm×75 µm (length×width×thickness) was subjected to corona treatment twice (total dose: 156) under plasma discharge at a dose of 78 using a corona treatment device. The corona-treated surfaces of the PET films were laminated on both surfaces of the adhesive film, thereby preparing a specimen, as shown in FIG. 1(a). The specimen was autoclaved under conditions of 3.5 bar and 50° C. for about 1,000 seconds and secured to a TA.XT_Plus texture analyzer (Stable Micro Systems Co., Ltd.). Referring to FIG. 1(b), with one of the PET films secured to the TA.XT_Plus Texture Analyzer at 25° C., T-peel strength was measured by pulling the other PET film at 50 mm/min.

(3) Flexural reliability: A module sample was fabricated by sequentially stacking a window film, an adhesive film, a polarizer, an adhesive film, and an OLED panel. The window film, the adhesive film, the polarizer, the adhesive film, and the OLED panel used in fabrication of the module sample were as follows:

Window film: A PET film (thickness: 100 µm, Cosmoshine TA015, Toyobo Co., Ltd.) was used.

Adhesive film: The adhesive films (thickness: 50 µm) prepared in Examples and Comparative Examples were used.

Polarizer: A PVA resin dyed with iodine was used. An 80 µm thick polyvinyl alcohol film (degree of saponification: 99.5, degree of polymerization: 2,000) was dipped and dyed in a 0.3% aqueous iodine solution and stretched to a length of 5.0 times an initial length thereof in the MD. Then, the stretched polyvinyl alcohol film was dipped in a 3% boric acid solution and a 2% aqueous potassium iodide solution for color correction. Then, the polyvinyl alcohol film was dried at 50° C. for 4 minutes, thereby providing a 25 µm thick polarizer.

OLED panel: A PET film (thickness: 100 µm, Cosmoshine TA015, Toyobo Co., Ltd.) was used.

The fabricated module sample was cut into a specimen having a size of 170 mm×110 mm (length×width) and subjected to 100,000 cycles of folding at 25° C. to evaluate generation of bubbles and cracks. The specimen was subjected to the folding test in the longitudinal direction of the specimen and in the folding direction of the OLED panel such that a bent portion of the specimen had a radius of curvature of 3 mm at a folding rate of 30 cycles per minute, where 1 cycle refers to an operation of folding the specimen to have the radius of curvature, followed by unfolding the adhesive film back to 180°. No delamination between the window film and the adhesive film, between the adhesive film and the polarizer, and between the adhesive film and the OLED panel was evaluated as "good", and delamination between the window film and the adhesive film, between the adhesive film and the polarizer, and/or between the adhesive film and the OLED panel was evaluated as "poor".

(4) Impact resistance (unit: mm): Impact resistance was evaluated by a ball drop test. An adhesive sheet prepared by stacking the porous adhesive film (thickness: 100 µm) prepared in each of Examples and Comparative Examples on a PET film (thickness: 50 µm) was cut to a size of 5 cm×5 cm (length×width) and attached to a glass plate (length× width×thickness, 5 cm×5 cm×0.5 mm) via the porous adhesive film to prepare a specimen in which the glass plate, the porous adhesive film and the PET film are sequentially stacked in the stated sequence. The specimen was placed on two supports separated a predetermined distance from each other. Here, the PET film of the specimen was placed at the uppermost side. A height at which the specimen was fractured upon dropping a 7 g steel ball on the PET was measured. An initial height at which the glass started to break was measured while increasing the dropping height of the steel ball. A higher initial height indicates better impact resistance.

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
| Monomer | EHA | 74 | 72 | 70 | 74 | 74 | 60 | 75 |
|  | HBA | 25 | 25 | 25 | 25 | 25 | 40 | 25 |
|  | PEGA | 1 | 3 | 5 | 1 | 1 | 0 | 0 |
| Crosslinking agent | SR-610 | 0.1 | 0.1 | 0.1 | 0 | 0.1 | 0.1 | 0.1 |
|  | HDDA | 0 | 0 | 0 | 0.1 | 0 | 0 | 0 |
| Initiator | Irgacure651 | 0.3 | 0.3 | 0.3 | 0.3 | 0.3 | 0.3 | 0.3 |
| Bubbles |  | Present | Present | Present | Present | Absent | Present | Present |
| Modulus | @25° C. | 24 | 22 | 21 | 27 | 31 | 45 | 30 |
|  | @80° C. | 18 | 17 | 16 | 22 | 23 | 35 | 24 |

TABLE 1-continued

|  | Example | | | | Comparative Example | | |
| --- | --- | --- | --- | --- | --- | --- | --- |
|  | 1 | 2 | 3 | 4 | 1 | 2 | 3 |
| Peel strength | 1180 | 1150 | 1100 | 1150 | 1300 | 1500 | 1200 |
| Flexural reliability | Good | Good | Good | Good | Poor | Poor | Poor |
| Impact resistance | 200 | 210 | 220 | 150 | 130 | 90 | 100 |

*2-EHA: 2-ethylhexylacrylate
*4-HBA: 4-hydroxybutylacrylate
*PEGA: methoxy polyethylene glycol(400) acrylate (AM-90G, Shin-Nakamura Chemical Co., Ltd.)
*SR-610: polyethylene glycol (600) diacrylate (SR-610, Sartomer Co., Ltd.)
*HDDA: 1,6-hexane diol diacrylate As shown in Table 1, even with a monolayer structure, the adhesive film according to the present invention exhibited good properties in terms of impact resistance, flexural reliability, and peel strength with respect to an adherend.

On the contrary, although the adhesive film of Comparative Example 1 was formed of the adhesive composition including a (meth)acrylic copolymer having a hydroxyl group and an alkylene glycol group, the adhesive film did not contain bubbles and exhibited poor properties in terms of flexural reliability and impact resistance. Even with the bubbles, the adhesive films of Comparative Examples 2 and 3 formed of the adhesive composition not containing the (meth)acrylic copolymer having a hydroxyl group and an alkylene glycol group also exhibited poor properties in terms of flexural reliability and impact resistance.

It should be understood that various modifications, changes, alterations, and equivalent embodiments can be made by those skilled in the art without departing from the spirit and scope of the present invention.

The invention claimed is:

1. A porous adhesive film formed of an adhesive composition comprising a (meth)acrylic copolymer having a hydroxyl group and an alkylene glycol group,
wherein the porous adhesive film has a modulus of less than about 30 kPa at 25° C. and a modulus ratio between modulus at 25° C. and modulus at 80° C. of about 1:0.7 to about 1:1.0,
the porous adhesive film has a peel strength of about 700 gf/in or more at 25° C. and
the porous adhesive film includes bubbles distributed over the porous adhesive film and occupying a volume of 28 vol % to about 50 vol % relative to a total volume of the porous adhesive film,
wherein the (meth)acrylic copolymer comprises a copolymer of a monomer mixture comprising a hydroxyl group-containing (meth)acrylate, an alkylene glycol group-containing (meth)acrylate, and an alkyl group-containing (meth)acrylate,
wherein the alkylene glycol group-containing (meth)acrylate comprises polyethylene glycol (meth)acrylate, and wherein the polyethylene glycol (meth)acrylate comprises at least one selected from among ethyl hexyl polyethylene glycol (meth)acrylate, and octyl polyethylene glycol (meth)acrylate.

2. The porous adhesive film according to claim 1, wherein the porous adhesive film has a monolayer structure.

3. The porous adhesive film according to claim 1, wherein the volume occupied by the bubbles of the porous adhesive film is 30 vol % to about 50 vol % relative to the total volume of the porous adhesive film.

4. The porous adhesive film according to claim 1, wherein the monomer mixture comprises about 0.01 wt % to about 20 wt % of the alkylene glycol group-containing (meth)acrylate.

5. The porous adhesive film according to claim 1, wherein the monomer mixture comprises about 5 wt % to about 40 wt % of the hydroxyl group-containing (meth)acrylate, about 0.01 wt % to about 20 wt % of the alkylene glycol group-containing (meth)acrylate, and about 50 wt % to about 80 wt % of the alkyl group-containing (meth)acrylate.

6. The porous adhesive film according to claim 1, wherein the adhesive composition further comprises an alkylene glycol group-containing crosslinking agent.

7. The porous adhesive film according to claim 1, wherein the porous adhesive film has a modulus of about 50 kPa or less at 80° C.

8. The porous adhesive film according to claim 1, wherein the porous adhesive film has a thickness of about 10 μm to about 300 μm.

9. An optical member comprising: an optical film; and the porous adhesive film according to claim 1 formed on at least one surface of the optical film.

10. The optical member according to claim 9, wherein the optical film comprises an electromagnetic wave-shielding optical film.

11. An optical display device comprising the porous adhesive film according to claim 1.

12. The porous adhesive film according to claim 1, wherein the peel strength is measured by laminating a corona-treated PET film on each of two opposing surfaces of the adhesive film.

* * * * *